(12) United States Patent
Haedt et al.

(10) Patent No.: US 7,422,782 B2
(45) Date of Patent: Sep. 9, 2008

(54) PEELABLE/RESEALABLE PACKAGING FILM

(75) Inventors: Edward L. Haedt, Oshkosh, WI (US); Paul J. Sheridan, Neenah, WI (US); Joseph J. Michels, Fond du Lac, WI (US); Lynn M. Nett, Combined Locks, WI (US)

(73) Assignee: Curwood, Inc., Oshkosh, WI (US)

( * ) Notice: Subject to any disclaimer, the term of this patent is extended or adjusted under 35 U.S.C. 154(b) by 491 days.

(21) Appl. No.: 11/048,425

(22) Filed: Feb. 1, 2005

(65) Prior Publication Data

US 2006/0172131 A1    Aug. 3, 2006

(51) Int. Cl.
*B32B 7/04* (2006.01)
*B32B 7/10* (2006.01)
*B32B 15/06* (2006.01)
*B32B 15/082* (2006.01)
*B32B 25/06* (2006.01)

(52) U.S. Cl. .............. 428/41.7; 428/40.1; 428/41.8; 428/41.9; 428/42.2; 428/42.3; 428/213; 428/214; 428/215; 428/334; 428/336; 428/339; 428/346; 428/347; 428/349; 428/354; 428/355 R; 428/355 EN; 428/355 BL; 428/457; 428/461; 428/462; 428/474.7; 428/476.3; 428/480; 428/483; 428/507; 428/511; 428/512; 428/514; 428/515; 428/516; 428/517; 428/519; 428/521

(58) Field of Classification Search ................ None
See application file for complete search history.

(56) References Cited

U.S. PATENT DOCUMENTS

| | | | |
|---|---|---|---|
| 3,257,228 A * | 6/1966 | Reed | 428/347 |
| 3,329,331 A | 7/1967 | Morgan | |
| 3,454,210 A | 7/1969 | Spiegel et al. | |
| 4,500,021 A | 2/1985 | Bildusas | |
| 4,673,601 A | 6/1987 | Lamping et al. | |
| 4,705,707 A | 11/1987 | Winter | |
| 4,810,541 A | 3/1989 | Newman et al. | |
| 4,886,690 A | 12/1989 | Davis et al. | |
| 4,956,962 A | 9/1990 | Williams | |

(Continued)

FOREIGN PATENT DOCUMENTS

EP    0 534 471 A1    3/1993

(Continued)

OTHER PUBLICATIONS

Auras et al., Poly(Lactide); Moisture Sorption Characteristics and Storage Consequences, ANTEC, 2003, 2862-2866.

(Continued)

*Primary Examiner*—Vivian Chen
(74) *Attorney, Agent, or Firm*—Tom J. Hall (57) ABSTRACT

The present invention describes a multilayer film suitable for use in packaging applications comprising at least a polymeric first layer having a first surface and an opposing second surface wherein the polymeric first layer comprises a heat-sealable, water-insoluble polyester; a polymeric second layer having a first surface and an opposing second surface and comprising a pressure-sensitive adhesive, wherein the second surface of the polymeric second layer is in contact with the first surface of the polymeric first layer and forms a peelable/resealable bond therebetween; and a third layer in contact with the first surface of the polymeric second layer.

41 Claims, 4 Drawing Sheets

U.S. PATENT DOCUMENTS

| | | | |
|---|---|---|---|
| 5,089,320 A * | 2/1992 | Straus et al. | 428/216 |
| 5,330,269 A * | 7/1994 | Kamada et al. | 383/210 |
| 5,382,472 A * | 1/1995 | Yanidis et al. | 428/349 |
| 5,434,004 A | 7/1995 | Ajioka et al. | |
| 5,489,474 A | 2/1996 | Shinoda et al. | |
| 5,512,333 A | 4/1996 | Suskind | |
| 5,540,962 A | 7/1996 | Suskind | |
| 5,700,344 A | 12/1997 | Edgington et al. | |
| 5,753,724 A | 5/1998 | Edgington et al. | |
| 5,783,271 A | 7/1998 | Nishida et al. | |
| 5,786,092 A | 7/1998 | Lorenzo et al. | |
| 5,849,401 A | 12/1998 | El-Afandli et al. | |
| 5,882,749 A | 3/1999 | Jones et al. | |
| 5,882,789 A | 3/1999 | Jones et al. | |
| 6,027,677 A | 2/2000 | Ostapchenko et al. | |
| 6,080,478 A | 6/2000 | Karhuketo | |
| 6,153,276 A | 11/2000 | Oya et al. | |
| 6,201,068 B1 | 3/2001 | Tsai et al. | |
| RE37,171 E | 5/2001 | Busche et al. | |
| 6,245,437 B1 | 6/2001 | Shiiki et al. | |
| 6,248,430 B1 | 6/2001 | Toyoda et al. | |
| 6,312,823 B1 | 11/2001 | El-Afandi et al. | |
| 6,326,440 B1 | 12/2001 | Terada et al. | |
| 6,345,726 B1 | 2/2002 | Beeuwsaert | |
| 6,511,723 B1 | 1/2003 | Engelaere | |
| 6,534,172 B1 | 3/2003 | Kawashima | |
| 6,544,607 B1 | 4/2003 | Kuroki et al. | |
| 6,552,162 B1 | 4/2003 | Wang et al. | |
| 6,600,008 B1 | 7/2003 | Kobayashi et al. | |
| 6,649,732 B2 | 11/2003 | Kobayashi et al. | |
| 6,677,048 B2 | 1/2004 | Karhuketo et al. | |
| 6,777,050 B1 | 8/2004 | Engelaere | |
| 6,814,913 B2 * | 11/2004 | Mueller | 264/173.13 |
| 2001/0026874 A1 | 10/2001 | Karhuketo et al. | |
| 2002/0023924 A1 * | 2/2002 | Wisniewski et al. | 220/359.1 |
| 2003/0039775 A1 | 2/2003 | Kong | |

FOREIGN PATENT DOCUMENTS

| | | |
|---|---|---|
| EP | 0 974 615 A1 | 1/2000 |
| EP | 1 029 890 A2 | 8/2000 |
| EP | 1 038 906 A2 | 9/2000 |
| WO | WO 02/077080 A1 | 10/2002 |

OTHER PUBLICATIONS

Auras et al., Diffusion, Permeation, and Solubility Coefficients of Ethyl Acetate Through Poly(lactide) Films, Conference Abstracts 2003 IUFoST, Jul. 16-20, 2003.

* cited by examiner

PEELABLE/RESEALABLE PACKAGING FILM

FIELD OF THE INVENTION

The present invention generally relates to multilayer films for packaging applications, and particularly, to multilayer films for packaging applications which have at least one peelable and resealable inter-layer interface.

BACKGROUND OF THE INVENTION

As is known in the art, packaging films which incorporate a seal area having a peelable/resealable film interface provide for the consumer an easy means to both open a container without having to tear the package and re-close the container as often as needed. In general, peelable/resealable film interfaces are formed when two film surfaces are bonded or sealed together during the package fabrication process. This seal area or bond is considered "peelable" if the consumer simply grasps a portion of the film and pulls or "peels" it away from a second portion-thereby causing at least two adjacent film layers to delaminate and exposing the surface of each layer. The initial force needed to separate the layers is relatively strong before the package is opened in order for the seal area to withstand the expected abuse during the packaging operation, distribution, and storage. By contrast, after the package has been initially opened, the peeling force required to break the seal and re-open the package is relatively weak thereafter. Moreover, the bond is considered "resealable" if the consumer simply engages the two exposed film surfaces together-thereby causing the seal between the layers to re-establish. Generally, the force require to "reseal" the two exposed surfaces is proportional to the pressure exerted on the seal area or bond by the consumer. The means of forming peelable/resealable bonds and their use in packaging applications are disclosed in the art.

U.S. Pat. No. 6,777,050 to Engelaere describes a cover for food containers which comprises a support layer, a pressure-sensitive adhesive layer, and a tearable-heat sealable layer. The tearable-heat sealable layer is fabricated from polyethylene or metallocene catalyzed polyethylene and the pressure-sensitive adhesive layer is formed from polyurethane.

U.S. Pat. No. 5,089,320 to Straus et al. discloses a packaging material containing a substrate layer of polyethylene terephthalate or high density polyethylene, an adhesive layer comprising a tacky adhesive, and a heat seal layer of polystyrene, polyvinylidene chloride, or ionomer. Delamination of packaging material may occur either between the substrate or adhesive layers or the adhesive and heat seal layers.

U.S. Pat. No. 4,786,190 to Van Erden et al. discloses a bag having a pressure-sensitive adhesive strip secured to the inside surface of a flap which is covers the mouth of the bag. When the flap is folded over the mouth onto the bag, it may be peelably secured to an outside surface of the bag.

U.S. Pat. No. 4,673,601 to Lamping et al. describes a film for sealing a container comprising a carrier layer of polyester, polyamide, polyvinyl chloride, biaxially oriented polypropylene, regenerated cellulose, aluminum, or paper, an adhesive layer of ethylene/vinyl acetate copolymer, styrene/butadiene/styrene block copolymer, styrene/isoprene/styrene block copolymer, or polyacrylate, and a covering layer of polyethylene, polypropylene, polyamide, polyvinyl chloride, hot melts, regenerated cellulose, aluminum, or paper. The film will delaminate at the cover layer/adhesive layer interface.

U.S. Pat. No. 3,454,210 to Spiegel et al. discloses a cover film for packaging containers having a layer of polyethylene, a layer of pressure-sensitive adhesive, and a rupturable layer of polyethylene.

U.S. Pat. No. 3,329,331 to Morgan describes a laminate for manufacturing resealable containers. The laminate comprises a paper base material, a lacquer coating on the base material, a pressure-sensitive adhesive, and a surface sheet of either paper or plastic. The pressure-sensitive adhesive is releasably and resealably adhered to the lacquer coating on the base material.

There still remains a need in the packaging industry for a peelable/resealable film having improved functionality. Such a film would provide a peelable/resealable bond or inter-layer interface which would allow the consumer to easily open and re-seal a package formed from this film as often as desired. Ideally, such a film would allow the a peelable/resealable bond to open at an initial predetermined peel force and re-open at a second and different predetermined peel force. The present invention provides such a peelable/resealable film.

SUMMARY OF THE INVENTION

This present invention relates to packaging films comprising a plurality of layers having at least a polymeric first layer, a polymeric second layer, and a third layer, which may be particularly suitable for food packaging applications. It has been discovered that the peelable/resealable functionality may be produced in films where the polymeric first layer and the polymeric second layer each have a predetermined composition and when the polymeric second layer may be positioned in contact with the first and third layers. Accordingly, the polymeric first layer may be an innermost exterior-film layer which may include a first surface and an opposing second surface and which may comprise a heat-sealable, water-insoluble polyester. The polymeric second layer may be an interior-film layer having a first surface and an opposing second surface which may comprise a pressure-sensitive adhesive. The polymeric first and second layers may be coextruded together so that the polymeric first layer is immediately adjacent to and in contact with the polymeric second layer. The bond between the polymeric first and second layers is a peelable/resealable bond such that the polymeric first and second layers may be manually delaminated and re-adhered. The third layer may comprise any material such as a thermoplastic, a cellulosic, a metallic material or combinations thereof which may bond directly with the surface of the polymeric second layer. The third layer may also be coextruded along with the polymeric first and second layers.

In one aspect of the multilayer films of the present invention, the heat-sealable, water-insoluble polyester of the polymeric first layer may include, homopolymers and copolymers of alkyl-aromatic esters, such as, for example, but not limited to, polyethylene terephthalate (PET), amorphous polyethylene terephthalate (APET), crystalline polyethylene terephthalate (CPET), glycol-modified polyethylene terephthalate (PETG), and polybutylene terephthalate; copolymers of terephthalate and isophthalate, such as, for example, but not limited to, polyethylene terephthalate/isophthalate copolymer; and homopolymers and copolymers of aliphatic esters such as, for example, polylactic acid (PLA) and polyhydroxyalkonates, such as, for example, but not limited to, polyhydroxypropionate, poly(3-hydroxybutyrate) (PH3B), poly(3-hydroxyvalerate) (PH3V), poly(4-hydroxybutyrate) (PH4B), poly(4-hydroxyvalerate) (PH4V), poly(5-hydroxyvalerate) (PH5V), poly(6-hydroxydodecanoate) (PH6D) and blends of any of these materials.

In another aspect of the multilayer films of the present invention, the pressure sensitive adhesive or tacky adhesive of the polymeric second layer may comprise an elastomeric first component and a tackifier second component. The elastomeric first component may comprise styrene/rubber copolymers which include, but is not limited to, for example, polystyrene/butadiene/styrene (SBS), polystyrene/isoprene/styrene (SIS), polystyrene/ethylene-butylene/styrene (SEBS), and polystyrene/ethylene-propylene/styrene (SEPS), or blends of any of these materials. The tackifier second component may comprise any tackifier conventionally used with elastomers to form pressure sensitive adhesives. Suitable tackifiers include, but are not limited to, hydrocarbon tackifiers such as terpene resins, such as resins sold under the trademark Zonatac® by Arizona Chemical Company, Jacksonville, Fla., U.S.A., and petroleum hydrocarbon resins, such as resins sold under the trademark Escorez® by ExxonMobil Chemical Company, Houston, Tex., U.S.A.

In yet another aspect of the multilayer films of the present invention, peelable/resealable functionality may be provided by the bond formed by the first surface of the polymeric first layer in direct contact with the first surface of the polymeric second layer. The opposing second surface of the polymeric first layer may be capable of heat-sealing to itself or other substrates so that the strength of the heat-seal bond may be greater than the strength of the bond between the polymeric first layer and the polymeric second layer. Accordingly, the opposing second surface of the polymeric second layer may also be capable of bonding to the third layer so that the bond between these layers may be greater than the strength of the bond between the polymeric first layer and the polymeric second layer.

In yet another aspect, the bond between the polymeric first and second layers may be peelable/resealable and may include at least two distinctive bond strengths which may be varied and controlled over a relatively large range, i.e., between 0.1 lb/in to about 8 lb/in (less than 0.017 Kg/cm to about 1.38 Kg/cm). Accordingly, the peelable/resealable bond may include both an initial first peel strength and a re-tack second peel strength. The initial first peel strength may be characterized as the manual force required to delaminate the polymeric first layer from the polymeric second layer. Preferably, the initial first peel strength may be greater than the re-tack second peel strength. The initial first peel strength may be at least 2 lb/in (0.36 Kg/cm) as measure in accordance with ASTM F-904 test method when a peelable/resealable bond is formed by heat sealing the film to itself at a temperature of between 126-149° C. or, alternatively, at least 3 lb/in (0.54 Kg/cm) as measure in accordance with ASTM F-904 test method when a peelable/resealable bond is formed by heat sealing the film to itself at a temperature of between 126-149° C. The re-tack second peel strength may be characterized as the manual force required to separate the polymeric first layer from the polymeric second layer after these layers have been initially laminated, delaminated and subsequently re-adhered. Preferably, the value of the re-tack second peel strength may be less than the value of the initial first peel strength. Accordingly, the re-tack second peel strength may be at least 0.50 lb/in (0.09 Kg/cm) as measure in accordance with ASTM F-904 test method after a peelable/resealable bond is formed by heat-sealing the film to itself at a temperature of between 126-149° C., manually separating the film along the peelable/resealable bond, and re-sealing the film to itself. Alternatively, the re-tack second peel strength may be at least 0.60 lb/in (0.11 Kg/cm) as measure in accordance with ASTM F-904 test method after a peelable/resealable bond is formed by heat-sealing the film to itself at a temperature of between 126-149° C., manually separating the film along the peelable/resealable bond, and re-sealing the film to itself.

In yet still another aspect, the multilayer films of the present invention may provide flexible bags, pouches, containers, lids and portions thereof which are peelable/resealable and which is an improvement over prior art packages.

These and other aspects, advantages, and features of the invention will be more readily understood and appreciated by reference to the detailed description of the invention and the drawings.

DETAILED DESCRIPTION OF THE INVENTION

As used herein, the term "film" is use in the generic to include plastic web, regardless of whether it is a film or sheet.

As used herein, the phrase "thermoplastic" refers to a polymer or polymer mixture that softens when exposed to heat and returns to its original condition when cooled to room temperature. In general, thermoplastic materials include, but are not limited too, synthetic polymers such as polyesters, polyamides, polyolefins, polystyrenes, and the like. Thermoplastic materials may also include any synthetic polymer that are cross-linked by either radiation or chemical reaction during a manufacturing or post-manufacturing process operation.

As used herein, the term "polymeric" refers to a material which is the product of a polymerization reaction of natural, synthetic, or natural and synthetic ingredients, and is inclusive of homopolymers, copolymers, terpolymers, etc. In general, the layers of a film or substrate may comprise a single polymer, a mixture of a single polymer and non-polymeric materials, a combination of two or more polymeric materials blended together, or a mixture of a blend of two or more polymeric materials and non-polymeric materials.

As used herein, the term "copolymer" refers to polymers formed by the polymerization of reaction of at least two different monomers. For example, the term "copolymer" includes the co-polymerization reaction product of ethylene and an α-olefin, such as 1-hexene. The term "copolymer" is also inclusive of, for example, the co-polymerization of a mixture of ethylene, propylene, 1-butene, 1-hexene, and 1-octene. As used herein, a copolymer identified in terms of a plurality of monomers, e.g., "ethylene/propylene copolymer", refers to a copolymer in which either monomer may copolymerize in a higher weight or molar percent than the other monomer or monomers. However, the term "copolymer" as used herein refers to those polymers where the first listed monomer is polymerizes in a higher weight percent than the second listed monomer.

As used herein, terminology employing a "/" with respect to the chemical identity of a copolymer (e.g., polyvinylidene chloride/methyl acrylate copolymer), identifies the comonomers which are copolymerized to produce the copolymer.

As used herein, the phrase "polyolefin" refers to homopolymers, copolymers, including e.g. bipolymers, terpolymers, block copolymer, grafted copolymers, etc., having a methylene linkage between monomer units which may be formed by any method known to those skill in the art. Examples of polyolefins include polyethylene (PE) which include, but are not limited to, low-density polyethylene (LDPE), linear low-density polyethylene (LLDPE), very low-density polyethylene (VLDPE), ultra low-density polyethylene (ULDPE), medium-density polyethylene (MDPE), high-density polyethylene (HDPE), ultra high-density polyethylene (UHDPE), and polyethylenes comprising ethylene/α-olefin (E/AO) which are copolymers of ethylene with one or more α-olefins (alpha-olefins) such as butene-1, hexene-1, octene-1, or the like as a comonomer, and the like. Other examples of polyolefins include cyclic olefin copolymers (COC), ethylene/propylene copolymers (PEP), polypropylene (PP), propylene/ethylene copolymer (PPE), polyisoprene, polybutylene (PB), polybutene-1, poly-3-methylbutene-1, poly-4-methylpentene-1, ionomers (IO), and propylene/α-olefins (P/AO) which are copolymers of propylene with one or more α-olefins (alpha-olefins) such as butene-1, hexene-1, octene-1, or the like as a comonomer, and the like.

As used herein, the term "polyester" refers to homopolymers or copolymers having an ester linkage between monomer units which may be formed, for example, by condensation polymerization reactions between a dicarboxylic acid and a glycol. The ester can be represented by the general formula: $[R—C(O)O—R']_n$ where R and R'=alkyl group and may be generally formed from the polymerization of dicarboxylic acid and diol monomers or monomers containing both carboxylic acid and hydroxy moieties. The dicarboxylic acid may be linear or aliphatic, i.e., oxalic acid, malonic acid, succinic acid, glutaric acid, adipic acid, pimelic acid, suberic acid, azelaic acid, sebacic acid, and the like; or may be aromatic or alkyl substituted aromatic, i.e., various isomers of phthalic acid, such as paraphthalic acid (or terephthalic acid), isophthalic acid and naphthalic acid. Specific examples of alkyl substituted aromatic acids include the various isomers of dimethylphthalic acid, such as dimethylisophthalic acid, dimethylorthophthalic acid, dimethylterephthalic acid, the various isomers of diethylphthalic acid, such as diethylisophthalic acid, diethylorthophthalic acid, the various isomers of dimethylnaphthalic acid, such as 2,6-dimethylnaphthalic acid and 2,5-dimethylnaphthalic acid, and the various isomers of diethylnaphthalic acid. The glycols may be straight-chained or branched. Specific examples include ethylene glycol, propylene glycol, trimethylene glycol, 1,4-butane diol, neopentyl glycol and the like. The polyalkyl terephthalates are aromatic esters having a benzene ring with ester linkages at the 1,4-carbons of the benzene ring as compared to polyalkyl isophthalates, where two ester linkages are present at the 1,3-carbons of the benzene ring. In contrast, polyalkyl naphthalates are aromatic esters having two fused benzene rings where the two ester linkages may be present at the 2,3-carbons or the 1,6-carbons. An example of a commercial copolyester suitable for use with the present invention is Kodabond 5116 manufactured by Eastman Chemical Company, Kingsport, Tenn., U.S.A.

As used herein, the terms "polylactic acid" and "polylactide" are used synonymously throughout this disclosure to describe homopolymers or copolymers having an ester linkage between monomer units and can be represented by the general formula: $[—OCH(R)C(O)—]_n$ where $R=CH_3$. Polylactic acid may be fabricated by polymerizing lactic acid, which is mostly produced from by carbohydrate fermentation of corn. Polylactic acid may be also produced by polymerization of lactide which obtained by condensation of two lactic acid molecules. Polylactic acid has a glass transition temperature of ranges from 50-80° C. while the melting temperature ranges from 130-180° C. Polylactic acid is known by those skilled in the art and fully disclosed in U.S. Pat. Nos. 5,698,322; 5,142,023; 5,760,144; 5,593,778; 5,807,973; and 5,010,145, the entire disclosure of each of which is hereby incorporated by reference. Examples of commercially available polylactic acid are sold under the trademark NatureWorks™ PLA Polymer in grades 4031-D, 4032-D, and 4041-D from Cargill Dow LLC, Minneapolis, Minn., U.S.A.

As used herein, the term "polyhydroxyalkonates" refers to polyesters having a 3-hydroxy alkonate moiety in the polymer backbone. Polyhydroxyalkonates are semi-crystalline thermoplastic polyester which are water insoluble and can be represented by the general formula: $[—OCH(R)—(CH_2)_xC(O)—]_n$ where $x=1-3$ and $R=H$ or $C_mH_{2m+1}$, where $m=1-11$. An examples of a commercially available polyhydroxyalkonates are sold by Metabolix, Cambridge, Mass., U.S.A.

As used herein, the term "polyamide" refers to homopolymers or copolymers having an amide linkage between monomer units which may be formed by any method known to those skill in the art. Useful polyamide homopolymers include nylon 6 (polycaprolactam), nylon 11 (polyundecanolactam), nylon 12 (polylauryllactam), and the like. Other useful polyamide homopolymers also include nylon 4,2 (polytetramethylene ethylenediamide), nylon 4,6 (polytetramethylene adipamide), nylon 6,6 (polyhexamethylene adipamide), nylon 6,9 (polyhexamethylene azelamide), nylon 6,10 (polyhexamethylene sebacamide), nylon 6,12 (polyhexamethylene dodecanediamide), nylon 7,7 (polyheptamethylene pimelamide), nylon 8,8 (polyoctamethylene suberamide), nylon 9,9 (polynonamethylene azelamide), nylon 10,9 (polydecamethylene azelamide), nylon 12,12 (polydodecamethylene dodecanediamide), and the like. Useful polyamide copolymers include nylon 6,6/6 copolymer (polyhexamethylene adipamide/caprolactam copolymer), nylon 6/6,6 copolymer (polycaprolactam/hexamethylene adipamide copolymer), nylon 6,2/6,2 copolymer (polyhexamethylene ethylenediamide/hexamethylene ethylenediamide copolymer), nylon 6,6/6,9/6 copolymer (polyhexamethylene adipamide/hexamethylene azelaiamide/caprolactam copolymer), as well as other nylons which are not particularly delineated here. Exemplary of even more suitable polyamides include nylon 4,I, nylon 6,I, nylon 6,6/6I copolymer, nylon 6,6/6T copolymer, MXD6 (poly-m-xylylene adipamide), nylon 6T/6I copolymer, nylon 6/MXDT/I copolymer, nylon MXDI, poly-p-xylylene adipamide, polyhexamethylene terephthalamide, polydodecamethylene terephthalamide and the like.

As used herein, the term "polystyrene" refers to homopolymers and copolymers having at least one styrene monomer (benzene having an ethylene substituent) linkage within the repeating backbone of the polymer. The styrene linkage can be represented by the general formula: $[(C_6R_5)CH_2CH_2]_n$ where $R=H$ or an alkyl group. Polystyrene may be formed by any method known to those skill in the art. Suitable polystyrene resins include, for example, but are not limited to, polystyrene (PS), oriented polystyrene (OPS), syndiotactic polystyrene (SPS), acrylonitrile-butadiene-styrene (ABS), styrene-acrylonitrile (SAN), ethylene/styrene copolymers, styrene/acrylic copolymers, styrene block copolymers (SBC), and the like.

As used herein, the phrase "styrene/rubber copolymer" refers to block copolymers including di-block, tri-block, radial block, multi-block and mixtures thereof of styrene and rubber. Suitable rubber segment of styrene/rubber copolymers may include, but are not limited to, butadiene, isoprene, butylene, ethylene-butylene, propylene, ethylene-propylene, ethylene and blends thereof. Exemplary styrene/rubber copolymers which are commercially available include styrene/rubber copolymers sold under the trademark Kraton® by Kraton Polymers, Houston, Tex., U.S.A. Styrene/rubber copolymers are fully disclosed in U.S. Pat. No. 5,221,534, the disclosure of which is incorporated herein by reference.

As used herein, the term "tackifier" is generally an adhesive additive which serves to modify the rheological properties of the final adhesive. Specifically, a tackifier resin to improves the tack of the adhesive composition. As used herein, the term "tack" refers to the "stickiness" of the adhesive or its resistance to removal or deformation from a substrate. The tackifier may comprise any suitable material, preferably, a hydrocarbon resin material or mixtures thereof. Exemplary tackifiers are Escorez® 1102, Escorez® 1304, Escorez® 1315, available from ExxonMobil Chemical Company, Houston, Tex., U.S.A.; Wingtak® resins available from Goodyear Chemicals, Akron, Ohio, U.S.A.; Piccotac® 1100 and Polypale® 100 available from Eastman Chemicals, Kingsport, Tenn., U.S.A.

As used herein, the phrase "metallic material" as applied to film layers refers to a metal and/or metal oxide which may be present in such form as a metal foil or metallic coating. Suitable metals and metal oxides may include, but are not limited to, aluminum, aluminum oxide, zinc, zinc oxide, nickel, nickel oxide, copper, copper oxide, silver, silver oxide and mixtures thereof.

As used herein, the phrase "cellulosic material" as applied to film layers refers to any natural or synthetic material comprising paper fibers, wood fibers, wood pulp or powder and the like.

As used herein, the term "coextrusion" refers to the process of extruding two or more materials through a single die with two or more orifices arranged so that the extrudates merge and weld together into a laminar structure before chilling, i.e., quenching. Coextrusion can be employed in blown film, cast film, and extrusion coating.

As used herein, the phrase "peel strength" refers to the bond or adhesive strength between the heat-sealable, innermost exterior film-layer and the adjacent adhesive layer and accordingly it depends primarily on the chemical similarity or dissimilarity of the materials which form the two layers. Peel strength of known materials may also be affected by production conditions, packaging machine conditions, and environmental conditions during film fabrication, the packaging process and storage. The multilayer film according to the present invention may be heat-sealed to itself such that two portions of the external innermost layer are brought into contact with each other using heat-seal jaws and by applying a pressure (force) of 30 psi for 1 second at a temperature of between 126-149° C. The external innermost layer may then be separated or delaminated from an adjacent adhesive layer (a polymeric second layer) and the force required to separate these layers may be measured in accordance with ASM F-904 test method. This is referred to as the "initial first peel strength". After delamination, the separated portions of film may be manually rejoined by applying a manual force at this seal region of the film. The external innermost layer may further be re-separated or delaminated from an adjacent adhesive layer (second polymeric layer) and the force required to separate these layers may be measured in accordance with ASM F-904 test method. This is referred to as the "re-tack second peel strength".

As used herein, the phrase "peelable/resealable bond" as used herein refers to at least one bond between two adjacent film layers which is adapted to easily separate or delaminate by manually pulling apart the film, and reseal or re-adhere to itself by bringing the separated portions of film together by application of manual pressure.

As used herein, the terms "heat-seal", "heat-sealing", "heat-sealable", and the like refer to a first portion of a film surface (i.e., formed from a single layer or multiple layers) which is capable of forming a fusion bond to a second portion of a film surface. A heat-seal layer is capable of fusion bonding by conventional indirect heating means which generate sufficient heat on at least one film contact surface for conduction to the contiguous film contact surface and formation of a bond interface therebetween without loss of the film integrity. It should be recognized that heat sealing can be performed by any one or more of a wide variety of manners, such as using a heat seal technique (e.g., melt-bead sealing, thermal sealing, impulse sealing, ultrasonic sealing, hot air, hot wire, infrared radiation, etc.).

As used herein, the phrase "innermost exterior-film layer" as applied to film layers of the present invention refers to the exterior-film layer which is closest to the product relative to the other layers of the multilayer film. An innermost exterior-film layer may serve as a food-contact layer. The phrase "exterior-film as applied to film layers refers to the any layer having less than two of its principal surfaces directly adhered to another layer of the film. In contrast, the phrase "outermost exterior-film layer", as used herein refers to the exterior-film layer which is furthest from the product relative top the other layers of the multilayer film.

As used herein, the phrase "interior-film layer" as applied to film layers refers to any film layer having both its principal surfaces directly adhered to another layer of the film.

As used herein, the phrase "food-contact layer" as applied to film layers refers to any film layer of a multilayer film which is in direct contact with the food product packaged in the film.

As used herein, the phrase "pressure-sensitive adhesive" refers to adhesives which are tacky upon the application of pressure without its tackiness being essentially dependent upon temperature elevation.

As used herein, the term "water-insoluble" as applied to polymeric materials used in forming one or more film layers refers to those polymeric materials which are not soluble in water.

As used herein, the phrase "direct contact" as applied to film layers, is defined as adhesion of the subject film layer surface to another film layer surface (presumably, the entire planar surfaces).

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete and will fully convey the scope of the invention to those skilled in the art. Like numbers refer to like elements throughout.

Figure 1:
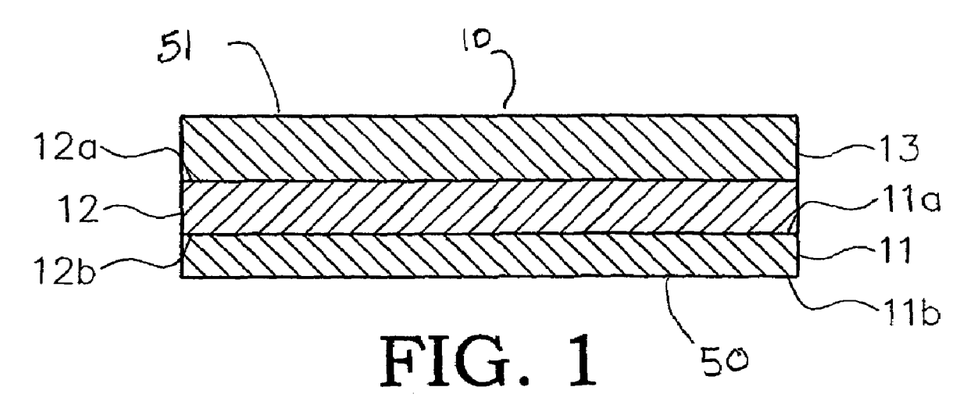
FIG. 1 is a partially schematic, cross-sectional view of one embodiment of a multilayer film according to the present invention comprising a polymeric first layer, a polymeric second layer, and a third layer.

FIG. 1 is a schematic cross-sectional diagram of one embodiment of a multilayered film according to the present invention. Depicted is one embodiment of the inventive film 10 comprising at least a polymeric first layer 11, a polymeric second layer 12, and a third layer 13. Polymeric first layer 11 may include a first surface 11a and an opposing second surface 11b such that first surface 11a may be in direct contact with polymeric second layer 12. Polymeric first layer 11 may be an external innermost film layer which may form an external innermost film surface 50 of film 10. Suitable materials for use in polymeric first layer 11 may include, homopolymers and copolymers of alkyl-aromatic esters, such as, for example, but not limited to, polyethylene terephthalate (PET), amorphous polyethylene terephthalate (APET), crystalline polyethylene terephthalate (CPET), glycol-modified polyethylene terephthalate (PETG), and polybutylene terephthalate; copolymers of terephthalate and isophthalate, such as, for example, but not limited to, polyethylene terephthalate/isophthalate copolymer; and homopolymers and copolymers of aliphatic esters such as, for example, polylactic acid (PLA) and polyhydroxyalkonates, such as, for example, but not limited to, polyhydroxypropionate, poly(3-hydroxybutyrate) (PH3B), poly(3-hydroxyvalerate) (PH3V), poly(4-hydroxybutyrate) (PH4B), poly(4-hydroxyvalerate) (PH4V), poly(5-hydroxyvalerate) (PH5V), poly(6-hydroxydodecanoate) (PH6D) and blends of any of these materials. Preferably, polymeric first layer 11 may comprise a water-insoluble polyester which may include an ester selected from the group consisting of polylactic acid, polyethylene terephthalate or blends thereof.

It will be appreciated that polymeric first layer 11 may have any thickness of between 0.01-1.0 mil (0.254-254 μm), preferably, between 0.05-0.5 mil (1.27-12.7 μm), and more preferably, between 0.1-0.3 mil (2.54-7.62 μm). It will also be appreciated that since polymeric first layer 11 may function as a heat-sealable and innermost exterior-film layer, it may also serve as a food-contact layer in films suitable for food packaging applications.

As depicted, polymeric second layer 12 may include a first surface 12a which may be in direct contact with the third layer 13, and an opposing second surface 12b which may be in direct contact with first surface 11a of polymeric first layer 11. Polymeric second layer 12 may comprise a pressure sensitive adhesive having a tackifier first component and a elastomeric second component. Preferably, the elastomeric second component may comprise a styrene/rubber copolymer which includes, but is not limited to, polymers, such as, for example, polystyrene/butadiene/styrene (SBS), polystyrene/isoprene/styrene (SIS), polystyrene/ethylene-butylene/styrene (SEBS), and polystyrene/ethylene-propylene/styrene (SEPS), or blends of any of these materials. Preferably, the styrene/rubber copolymer may include, but is not limited to, a material selected from the group consisting of butadiene, isoprene, ethylene-butylene, ethylene-propylene or combinations thereof.

As shown, third layer 13 may be immediately adjacent to first surface 12a of polymeric second layer 12. Third layer 13 may be an external outermost film layer and may form an external outermost surface 51 of film 10. Suitable materials for use in third layer 13 may include any material selected from the group consisting of a thermoplastic material, a cellulosic material, a metallic material, or a combination thereof. More particularly, third layer 13 may comprise a thermoplastic material which includes any thermoplastic, but preferably, polyolefins, polyesters, polyamides, polystyrenes or blends thereof, a cellulosic material, a metallic material which includes any metallic material, but preferably, metallic foils or metallic coatings.

Polymeric first layer 11 and polymeric second layer 12 may be coextruded together. When the third layer 13 comprises a thermoplastic material, then polymeric first layer 11, polymeric second layer 12 and third layer 13 may be coextruded together. In either case, any conventional coextrusion technique or combinations thereof may be used to form these layers and these methods include, but are not limited to, cast coextrusion, blown film coextrusion, extrusion lamination, extrusion coating, and the like. Preferably, polymeric first layer 11 and polymeric second layer 12 may be coextruded together using either cast or blown film coextrusion, and polymeric first layer 11, polymeric second layer 12 and third layer 13 may be coextruded together using either cast or blown film coextrusion. It will be appreciated by those skilled in the art that the multilayer films of the present invention are not limited to three layers and may further comprise any number of additional layers as desired.

Figure 2:
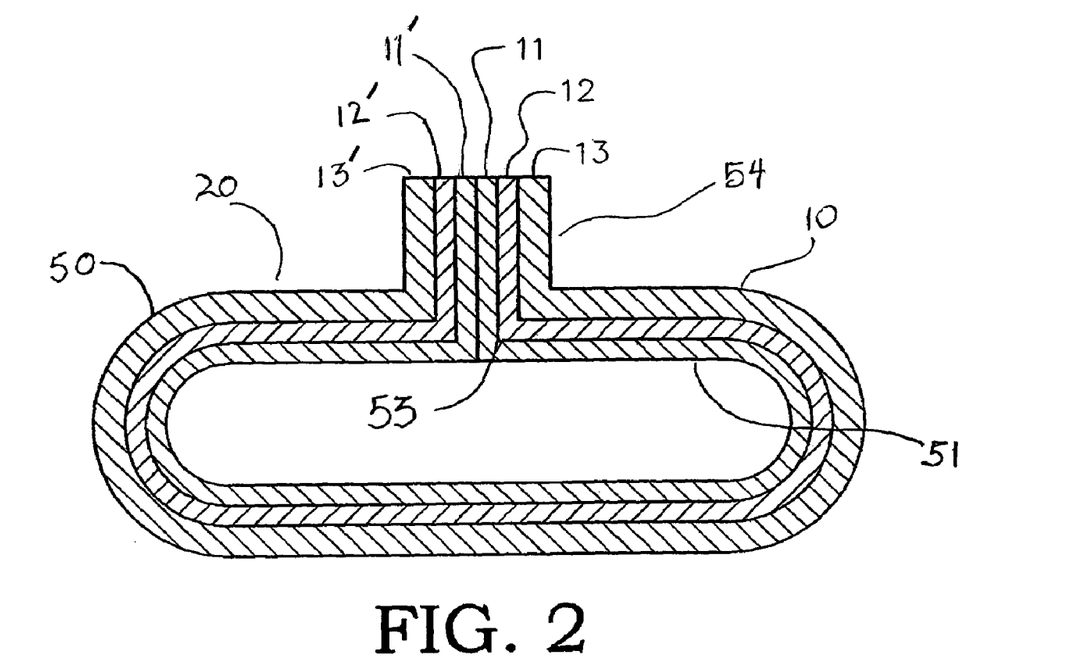
FIG. 2 is a partially schematic, cross-sectional view of one embodiment of a three-layer multilayer film according to the present invention in the form of a flexible package in a closed state.

FIG. 2 is a schematic cross-section diagram through a film according to the present invention in the form a package. FIG. 2 is for illustrative purposes only. In this embodiment, a tubular package 20 may be formed when a first portions of film 10, layers 11, 12, 13 brought together with a second portion of film 10, 11', 12', 13' and heat-sealed to form a peelable/resealable bond 53 in seal region 54. In this case, peelable/resealable bond 53 of seal region 54 is shown in a closed state. It will be appreciated by those skilled in the art that the multilayer films according to the present invention may be used to fabricate any container, bag, package, pouch or any portion thereof and are not limited to any particular size, shape or form. As depicted, layer 13(13') may serve as an external outermost film surface 50. Whereas, layer 11(11') may provide an external innermost film surface 51 and may also serve as a food-contact layer.

Figure 3:
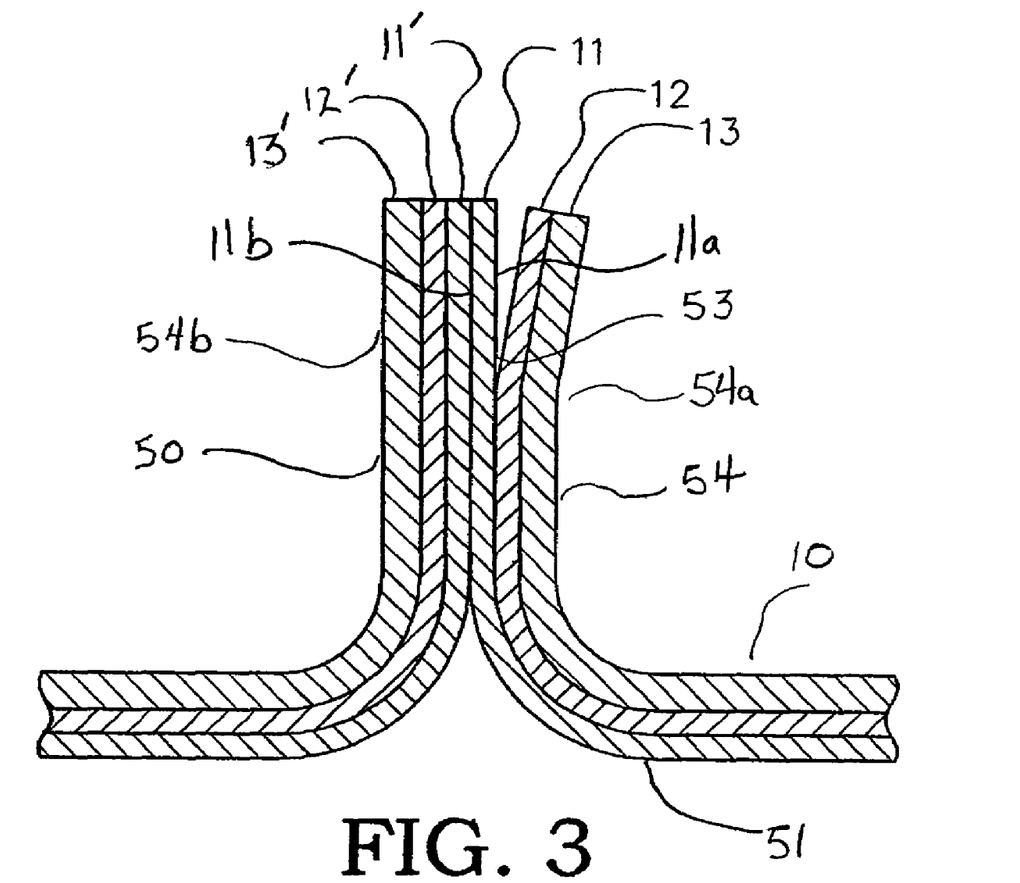
FIG. 3 is a partially schematic, cross-sectional view of one embodiment of a three-layer multilayer film according to the present invention in the form of a seal region of a flexible package in a partially opened state.

FIG. 3 is a schematic cross-sectional diagram through a film 10 which illustrates peelable/resealable bond 53 of seal region 54 of package 20 (see FIG. 2) in a partially opened state. FIG. 3 is for illustrative purposes only. To place peelable/resealable bond 53 in a partially or fully opened state, seal region 54 may be manually gripped and pulled apart in opposite directions. In doing so, the force exerted on the film 10 at seal region 54 may preferentially separate polymeric first layer 11 from polymeric second layer 12. The bond strength between a first portion of polymeric first layer 11 and a second portion of polymeric first layer 11' (formed after heat-sealed layers the film to itself) may be greater than the bond strength between polymeric first layer 11 and polymeric second layer 12. Additionally, the bond strength between polymeric second layer 12 and third layer 13 may be greater than the bond strength between polymeric first layer 11 and polymeric second layer 12. Accordingly, the first surface 11a of a first portion of polymeric first layer 11 may preferentially delaminate or separate from polymeric second layer 12 and the opposing second surface 11b of a first portion of polymeric first layer 11 may remain secured to the second portion of polymeric first layer 11'. If the package 20 (see FIG. 2) has never been opened before, the tearing force may eventually fracture polymeric first layer 11 which may completely divide the seal region 54 into two sections 54a and 54b (shown here in a partially divided state). As a result, the pressure-sensitive adhesive of polymeric second layer 12 may be exposed. For re-closing the package 20 (see FIG. 2), it may be only necessary to place section 54a in contact with section 54b such that the first surface 11a of polymeric first layer 11 of section 54b is in a face-to-face relationship with the surface of polymeric second layer 12 of section 54a, and manually press them lightly together. The package may be readily open and reclosed in this fashion repeatedly as needed. Accordingly, the force required to re-open the package 20 (see FIG. 2) by peeling polymeric first layer 11 from polymeric second layer 12 may be less than the force required to initially open the package 20 (see FIG. 2). It will be appreciate by those skilled in the art that peelable/resealable bond 53 is not limited to any particular mechanism by which polymeric first layer 11 may separate from polymeric second layer 12. Accordingly, there may be a cohesive failure where the adhesive of polymeric second layer 12 fractures and adhesive residue remains of the surface of both first surface 11a of a first portion of polymeric first layer 11 and the surface of polymeric second layer 12. Alternatively, the adhesive of polymeric second layer 12 may remain on only one of the adhered surfaces, with the matching surface free of adhesive.

Figure 4:
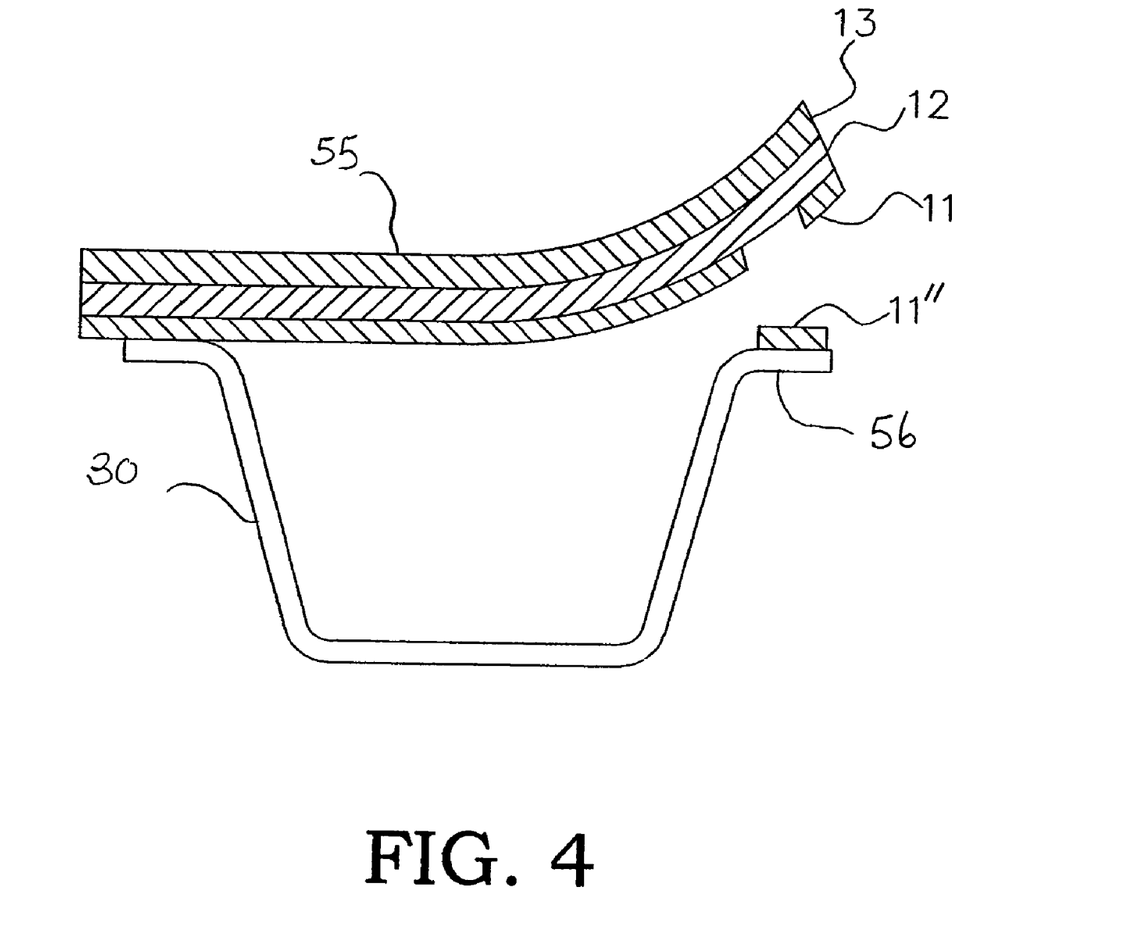
FIG. 4 is a partially schematic, cross-sectional view of another embodiment of a three-layer multilayer film according to the present invention in the form of a lid membrane in a partially opened state.

FIG. 4 is schematic cross-sectional diagram of another embodiment of the multilayer film according to the present invention in the form a lid membrane 55 on a rigid container 30, in a partially opened state. In FIG. 4, film 10 is not drawn to scale and is for illustrative purposes only. As depicted, the inventive film 10 may be heat-sealed to the opening of a preformed container 30 and may later wholly or partially be separated from the container rim 56. During tearing-open of the lid membrane 55, a small portion of polymeric first layer 11" of the film 10 may remain sealed to the rim of the container 56. Because the bond between polymeric first layer 11 and the container rim 56 may be stronger than the bond between polymeric first layer 11 and polymeric second layer 12, film 10 may rupture preferentially between polymeric first layer 11 and polymeric second layer 12, thus allowing the lid membrane 55 to be easily peeled apart from the container 30. The self-adhesive properties of the polymeric second layer 12 may further allow the lid membrane 55 to be easily re-tacked to the container rim 56.

EXAMPLES

The invention is illustrated by the following examples, which are provided for the purpose of representation, and are not to be construed as limiting the scope of the invention.

Unless otherwise noted, the thermoplastic resins utilized in the present invention are generally commercially available in pellet form and, as generally recognized in the art, may be melt blended or mechanically mixed by well-known methods using commercially available equipment including tumblers, mixers or blenders. Also, if desired, well known additives such as processing aids, slip agents, anti-blocking agents and pigments, and mixtures thereof may be incorporated into the film, by blending prior to extrusion. The resins and any additives are introduced to an extruder where the resins are melt plastified by heating and then transferred to an extrusion (or coextrusion) die for formation into a tube. Extruder and die temperatures will generally depend upon the particular resin or resin containing mixtures being processed and suitable temperature ranges for commercially available resins are generally known in the art, or are provided in technical bulletins made available by resin manufacturers. Processing temperatures may vary depending upon other processing parameters chosen.

In all the following examples, all film structures were produced using a single-bubble blown coextrusion apparatus and method. The single-bubble blown film apparatus includes a multi-manifold circular die head through which the film layers are forced and formed into a cylindrical multilayer film bubble. The bubble is quenched e.g., via cooled water bath, solid surface and/or air, and then ultimately collapsed and formed into a multilayer film.

For the following examples, a single slash, "/", represents the division between individual layers within a film structure.

Example 1

For Examples 1-4, the first polymeric layer comprised polyester which was dried to less than 250 ppm moisture and maintained at this moisture level during melt processing. The polyester comprised polylactic acid (PLA) having a density of 1.25 g/cm$^3$, a melting point of 160° C., a glass transition temperature of 58° C., a tensile strength at break (machine direction/transverse direction) of 15/21 kpsi, and is available under the trademark NatureWorks™ PLA Polymer 4032-D from Cargill Dow LLC, Minneapolis, Minn., U.S.A. In Example 1, the second layer was an adhesive comprising a block copolymer of styrene and elastomer having a density of 0.96 g/cm$^3$ and is available under the product name M3156 from Bostik Findley, Inc., Wauwatosa, Wis., U.S.A. The third layer comprised high-density polyethylene (HDPE) having density of 0.958 g/cm$^3$, a melt index of 0.85 g/10 min., a tensile strength at break (machine direction/transverse direction) of 3.7/3.8 kpsi, and is sold under the trademark of Alathon® L 5885 from Equistar Chemicals, LP, Houston, Tex., U.S.A. Example 1 was produced having an overall film thickness of 2.5 mil and with the following structure and layer thicknesses (% relative to overall thickness, beginning with the first layer and going left to right:

10% PLA/25% Adhesive/65% HDPE

Example 2

For Example 2, the first polymeric layer was identical in composition to that in Example 1. The second and third layers both comprised an adhesive comprising a block copolymer of styrene and elastomer having a density of 0.96 g/and is available under the product name M3156 from Bostik Findley, Inc., Wauwatosa, Wis., U.S.A. The fourth layer comprised ultra low density polyethylene (ULDPE) a density of 0.912 g/cm$^3$, a melt index of 1.0 g/10 min., a tensile strength at break (machine direction/transverse direction) of 7.1/6.5 kpsi, a melting point of 123° C., and is sold under the trademark of Attane® 4201G from The Dow Chemical Company, Midland, Mich., U.S.A. The fifth, sixth, and seventh layers each comprised high-density polyethylene (HDPE) having a density of 0.958 g/cm$^3$, a melt index of 0.95 g/10 min., a tensile strength at break (machine direction/transverse direction) of 7.9/3.4 kpsi, and is sold under the trademark of Alathon® M 6210 from Equistar Chemicals, LP, Houston, Tex., U.S.A. Example 2 was produced having an overall film thickness of 2.5 mil and with the following structure and layer thicknesses (% relative to overall thickness), beginning with the first layer and going left to right:

6.3% PLA/14.2% Adhesive/13.1% Adhesive/13.7% ULDPE/14.4% HDPE/14.4% HDPE/24.0% HDPE Example 3

For Example 3, the first polymeric layer was identical in composition to that in Example 1, and the second and third layers, respectively, were identical in composition to those in Example 2. The fourth, fifth, and sixth layers each comprised high-density polyethylene (HDPE) having a density of 0.958 g/cm$^3$, a melt index of 0.85 g/10 min., a tensile strength at break (machine direction/transverse direction) of 3.7/3.8 kpsi, and is sold under the trademark of Alathon® L 5885 from Equistar Chemicals, LP, Houston, Tex., U.S.A. The seventh layer comprises ultra low density polyethylene (UL- DPE) a density of 0.912 g/cm³, a melt index of 1.0 g/10 min., a tensile strength at break (machine direction/transverse direction) of 7.1/6.5 kpsi, a melting point of 123° C., and is sold under the trademark of Attane® 4201 G from The Dow Chemical Company, Midland, Mich., U.S.A. Example 3 was produced having an overall film thickness of 2.5 mil and with the following structure and layer thicknesses (% relative to overall thickness), beginning with the first layer and going left to right:

7.0% PLA/12% Adhesive/13% Adhesive/15% HDPE/14.5% HDPE/14.5% HDPE/24% ULDPE

Example 4

For Example 4, the first and the second polymeric layers were identical in composition to those used in Example 1. The third layer comprised a mixture of 47.35% (wt.) linear low-density polyethylene, 47.35% (wt.) ethylene/vinyl alcohol copolymer and 5.3% (wt.) processing additives. The linear low-density polyethylene (LLDPE) has a melting point of 121° C., a density of 0.918 g/cm³, a melt index of 1.0 g/10 min., a tensile strength at break (machine direction/transverse direction) of 6.67/5.37 kpsi, and is sold under the trademark ExxonMobil Escorene® LL-1001 from ExxonMobil Chemical Company, Houston, Tex., U.S.A. The ethylene/vinyl alcohol copolymer (E/VA) has 12% vinyl acetate content, a melting point of 95° C., a density of 0.93 g/cm³, a melt index of 0.35 g/10 min., and is sold under the trademark DuPont® Elvax® 3135X from E. I. duPont de Nemours and Company, Wilmington, Del., U.S.A. Example 4 was produced having a modulus of 54.6 Kpsi in the machine direction and 51.6 Kpsi in the transverse direction, an overall film thickness of about 2.75 mil and with the following structure and layer thicknesses (% relative to overall thickness), beginning with the first layer and going left to right:

9.1% PLA/18.2% Adhesive/72.7% (LLDPE+E/VA)

Example 5

For Example 5, the first polymeric layer comprised polyethylene terephthalate (PET) having a density of 1.31 g/cm³, a tensile modulus of 32 Kpsi, an elongation at break of less than 5% which is sold under the tradename Eastobond Copolyester 19412 from Eastman Chemical Company, Kingsport, Tenn., U.S.A. The second and third layers were identical in composition to that described in Example 4. Example 5 was produced having an overall film thickness of about 2.75 mil and with the following structure and layer thicknesses (% relative to overall thickness), beginning with the first layer and going left to right:

9.1% PET/18.2% Adhesive/72.7% (LLDPE+E/VA)

The invention may be further understood by reference to Table 1. Table 1 summaries the initial first peel strengths for the peelable/resealable bond in the film described in Example 3. In each case, the peelable/resealable bond was formed by heat sealing the film to itself using heat seal jaws by applying a pressure (force) of 30 psi for 1 second at various temperature between 126-149° C. Measurements were recorded in accordance with ASTM F-904 test method at a temperature of 23° C.

TABLE 1

Initial First Peel Strength (lb/in) for Peelable/Resealable Bond Formed at Various Temperatures (Example 3)

| 127° C. | 132° C. | 138° C. | 143° C. | 149° C. |
| --- | --- | --- | --- | --- |
| 4.6 | 4.8 | 3.7 | 4.2 | 4.4 |
| 4.5 | 2.9 | 3.7 | 4.2 | 3.5 |
| 4.5 | 4.1 | 4.4 | 4.0 | 4.1 |
| Ave. = 4.5 | Ave. = 4.0 | Ave. = 4.0 | Ave. = 4.1 | Ave. = 4.0 |

The invention may be further understood by reference to Table 2. Table 2 summaries the re-tack second peel strengths for the peelable/resealable bond in the film described in Example 3 obtained after the film was manually separated and subsequently re-seal to itself. In each case, the peelable/resealable bond was initially formed by heat sealing the film to itself using heat seal jaws by applying a pressure (force) of 30 psi for 1 second at a temperature of between 126-149° C. Measurements were recorded in accordance with ASTM F-904 test method at a temperature of 23° C.

TABLE 2

Re-tack Second Peel Strength (lb/in) for Peelable/Resealable Bond (Example 3)

| |
| --- |
| 0.86 |
| 0.75 |
| 0.93 |
| 0.84 |
| 0.64 |
| 0.92 |
| Ave. = 0.83 |

The invention may be again further understood by reference to Table 3. Table 3 summaries the initial first peel strengths for the peelable/resealable bond in the film described in Example 4. In each case, the peelable/resealable bond was initially formed by heat sealing the film to itself using heat seal jaws by applying a pressure (force) of 30 psi for 1 second at a temperature between 126-149° C. Measurements were recorded in accordance with ASTM F-904 test method at a temperature of 23° C.

TABLE 3

Initial First Peel Strength (lb/in) for Peelable/Resealable Bond Formed at Various Temperatures (Example 4)

| 127° C. | 132° C. | 138° C. | 143° C. | 149° C. |
| --- | --- | --- | --- | --- |
| 2.3 | 2.9 | 3.0 | 3.4 | 2.6 |

The invention may be still further yet understood by reference to Table 4. Table 4 summaries the re-tack second peel strengths for the peelable/resealable bond in the film described in Example 4 obtained after the film was manually separated and subsequently re-sealed to itself. In each case, the peelable/resealable bond was initially formed by heat sealing the film to itself using heat seal jaws by applying a pressure (force) of 30 psi for 1 second at a temperature of between 126-149° C. Measurements were recorded in accordance with ASTM F-904 test method at a temperature of 23° C.

TABLE 4

Re-tack Second Peel Strength (lb/in) for Peelable/Resealable Bond
(Example 4)

0.62
0.75
0.63
0.73
0.73
Ave. = 0.69

The invention may be still further understood by reference to Table 5. Table 5 summaries the initial peel strengths for the peelable/resealable bond in the film described in Example 5. In each case, the peelable/resealable bond was initially formed by heat sealing the film to itself using heat seal jaws by applying a pressure (force) of 30 psi for 1 second at a temperature of between 126-149° C. Measurements were recorded in accordance with ASTM F-904 test method at temperature of 23° C.

TABLE 5

Initial First Peel Strength (lb/in) for Peelable/Resealable Bond
Formed at Various Temperatures
(Example 5)

| 127° C. | 132° C. | 138° C. | 143° C. | 149° C. |
|---|---|---|---|---|
| 5.3 | 4.5 | 4.7 | 4.0 | 4.4 |

The invention may be still further yet understood by reference to Table 6. Table 6 summaries the re-tack second peel strengths for the peelable/resealable bond in the film described in Example 5 obtained after the film was manually separated and subsequently re-sealed to itself. In each case, the peelable/resealable bond was initially formed by heat sealing the film to itself using heat seal jaws by applying a pressure (force) of 30 psi for 1 second at a temperature of between 126-149° C. Measurements were recorded in accordance with ASTM F-904 test method at a temperature of 23° C.

TABLE 6

Re-tack Second Peel Strength (lb/in) for Peelable/Resealable Bond
(Example 5)

0.60
0.68
0.64
0.62
0.64
Ave. = 0.64

Unless otherwise noted, the physical properties and performance characteristics reported herein were measured by test procedures similar to the following methods. The following ASTM test procedures are incorporated herein by reference in their entireties.

| Density | ASTM D-1505 |
|---|---|
| Glass Transition Temperature | ASTM D-3418 |
| Melt Index | ASTM D-1238 |
| Melting Point | ASTM D-3417 |
| Peel Strength | ASTM F-904 |
| Seal Initiation Temperature | ATM F-88 |
| Tensile Strength | ASTM D-882 |
| Water Vapor Transmission Rate | ASTM F-1249 |

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A multilayer packaging film comprising:
   (a) at least a polymeric first layer, a polymeric second layer, and a third layer;
   (b) wherein said polymeric first layer is an exterior-film layer, said polymeric second layer is an internal-film layer and both polymeric first and second layers are coextruded together;
   (c) wherein said polymeric first layer has a first surface and an opposing second surface and comprises a heat-sealable, water-insoluble homopolymer or copolymer of aliphatic polyester;
   (d) wherein said polymeric second layer has a first surface and an opposing second surface and comprises a pressure-sensitive adhesive; wherein said second surface of said polymeric second layer is in direct contact with and bonded to said first surface of said polymeric first layer such that a peelable/resealable bond is formed between said polymeric first and second layers; wherein said first surface of said polymeric second layer is in direct contact with and bonded to said third layer; and
   (e) wherein said third layer comprises a material selected from the group consisting of a thermoplastic material, a cellulosic material, a metallic material and combinations thereof.

2. A multilayer packaging film comprising:
   (a) at least a polymeric first layer, a polymeric second layer, and a third layer;
   (b) wherein said polymeric first layer is an exterior-film layer, said polymeric second layer is an internal-film layer and both polymeric first and second layers are coextruded together;
   (c) wherein said polymeric first layer has a first surface and an opposing second surface and comprises a heat-sealable, water-insoluble homopolymer or copolymer of aliphatic polyester;
   (d) wherein said polymeric second layer has a first surface and an opposing second surface and comprises a pressure-sensitive adhesive; wherein said second surface of said polymeric second layer is in direct contact with and peelably and resealably bonded to said first surface of said polymeric first layer; wherein said bond between said first polymeric layer and said second polymeric layer is adapted to comprise both an initial peel strength and a re-tack second peel strength; wherein said first surface of said polymeric second layer is in direct contact with and bonded to said third layer; and
   (e) wherein said third layer comprises a material selected from the group consisting of a thermoplastic material, a cellulosic material, a metallic material and combinations thereof.

3. A multilayer packaging film according to claims 1 or 2, wherein at least said polymeric first layer and said polymeric second layer are coextruded together by either cast or blown film coextrusion.

4. A multilayer packaging film according to claims 1 or 2, wherein at least said polymeric first layer, said polymeric second layer and said third layer are coextruded together by either cast of blown film coextrusion.

5. A multilayer packaging film according to claims 1 or 2, wherein said heat-sealable, water-insoluble polyester is a material selected from the group consisting of homopolymer and copolymers of polylactic acid, polyhydroxyalkonates, and blends thereof.

6. A multilayer packaging film according to claims 1 or 2, wherein said pressure-sensitive adhesive comprises a tackifier first component and an elastomeric second component of a styrene/rubber block copolymer.

7. A multilayer packaging film according to claims 1 or 2, wherein said pressure-sensitive adhesive comprises a styrene/rubber block copolymer selected from the group consisting of butadiene, isoprene, ethylene-butylene, ethylene-propylene, and blends thereof.

8. A multilayer packaging film according to claims 1 or 2, wherein said peelable/resealable bond has an initial first peel strength of at least 2 lb/in (0.36 Kg/cm) as measured in accordance with ASTM F-904.

9. A multilayer packaging film according to claims 1 or 2, wherein said peelable/resealable bond has an initial first peel strength of at least 3 lb/in (0.54 Kg/cm) as measured in accordance with ASTM F-904.

10. A multilayer packaging film according to claims 1 or 2, wherein said peelable/resealable bond has a re-tack second peel strength of at least 0.50 lb/in (0.09 Kg/cm) as measured in accordance with ASTM F-904.

11. A multilayer packaging film according to claims 1 or 2, wherein said peelable/resealable bond has a re-tack second peel strength of at least 0.60 lb/in (0.11 Kg/cm) as measured in accordance with ASTM F-904.

12. A multilayer packaging film according to claims 1 or 2, wherein said heat-sealable, water-insoluble polyester comprises a homopolymer or copolymer of polylactic acid (PLA).

13. A multilayer packaging film according to claims 1 or 2, wherein said polymeric first layer has a thickness of between 0.05-0.5 mil (1.27-12.7 μm).

14. A multilayer packaging film according to claims 1 or 2, wherein said polymeric first layer has a thickness of between 0.1-0.3 mil (2.54-7.62 μm).

15. A multilayer packaging film according to claims 1 or 2, wherein said polymeric first layer is a food-contact layer.

16. A multilayer packaging film according to claims 1 or 2, wherein said thermoplastic material of said third layer comprises a polyolefin, polyester, polyamide, polystyrene and blends thereof.

17. A multilayer packaging film to claims 1 or 2, wherein said metallic material comprises either a metallic foil or a metallic coating.

18. A multilayer packaging film according to claims 1 or 2, wherein said film forms a container or a portion thereof.

19. A coextruded multilayer packaging film comprising:
(a) at least a polymeric first layer, a polymeric second layer, and a polymeric third layer;
(b) wherein said polymeric first layer is an innermost exterior-film layer having a first surface and an opposing second surface and comprises a heat-sealable, water-insoluble homopolymer or copolymer of polylactic acid, polyhydroxyalkonates, and blends thereof;
(c) wherein said polymeric second layer is an internal-film layer having a first surface and an opposing second surface and comprises a pressure-sensitive adhesive; wherein said second surface of said polymeric second layer is in direct contact with said first surface of said polymeric first layer and forms a peelable/resealable bond between said polymeric first and second layers; wherein said first surface of said polymeric second layer is in direct contact with said third layer; and
(d) wherein said third layer comprises a polyolefin.

20. A coextruded multilayer packaging film according to claim 19, wherein said film is formed by either cast or blown film coextrusion.

21. A coextruded multilayer packaging film according to claim 19; wherein said pressure-sensitive adhesive comprises a tackifier first component and an elastomeric second component of a styrene/rubber block copolymer.

22. A coextruded multilayer packaging film according to claim 21, wherein said styrene/rubber block copolymer comprises a material selected from the group consisting of butadiene, isoprene, ethylene-butylene, ethylene-propylene and blends thereof.

23. A coextruded multilayer packaging film according to claim 19, wherein said peelable/resealable bond has an initial first peel strength of at least 2 lb/in (0.36 Kg/cm) as measured in accordance with ASTM F-904.

24. A coextruded multilayer packaging film according to claim 23, wherein said peelable/resealable bond has an initial first peel strength of at least 3 lb/in (0.54 Kg/cm) as measured in accordance with ASTM F-904.

25. A coextruded multilayer packaging film according to claim 19, wherein said peelable/resealable bond has a re-tack second peel strength of at least 0.50 lb/in (0.09 Kg/cm) as measured in accordance with ASTM F-904.

26. A coextruded multilayer packaging film according to claim 25, wherein said peelable/resealable bond has a re-tack second peel strength of at least 0.60 lb/in (0.11 Kg/cm) as measured in accordance with ASTM F-904.

27. A coextruded multilayer packaging film according to claim 19, wherein said polymeric first layer has a thickness of between 0.05-0.5 mil (1.27-12.7 μm).

28. A coextruded multilayer packaging film according to claim 27, wherein said polymeric first layer has a thickness of between 0.1-0.3 mil (2.54-7.62 μm).

29. A coextruded multilayer packaging film according to claim 19, wherein said polymeric first layer is a food-contact layer.

30. A coextruded multilayer packaging film according to claim 19, wherein said film forms a container or a portion thereof.

31. A coextruded multilayer packaging film comprising:
(a) at least a polymeric first layer, a polymeric second layer, and a polymeric third layer;
(b) wherein said polymeric first layer is an exterior-film layer having a first surface and an opposing second surface and comprises a heat-sealable, water-insoluble homopolymer or copolymer of polylactic acid;
(c) wherein said polymeric second layer is an internal-film layer having a first surface and an opposing second surface and comprises a mixture of a tackifier first component and an elastomeric second component of a styrene/rubber block copolymer; wherein said second surface of said polymeric second layer is in direct contact with said first surface of said polymeric first layer and forms a peelable/resealable bond between said polymeric first and second layers; wherein said first surface is in direct contact with said third layer; and (d) wherein said third layer comprises a polyolefin.

32. A coextruded multilayer packaging film according to claim 31, wherein said film is formed by either cast or blown film coextrusion.

33. A coextruded multilayer packaging film according to claim 31, wherein said styrene/rubber block copolymer comprises a material selected from the group consisting of butadiene, isoprene, ethylene-butylene, ethylene-propylene and blends thereof.

34. A coextruded multilayer packaging film according to claim 31, wherein said peelable/resealable bond has an initial first peel strength of at least 2 lb/in (0.36 Kg/cm) as measured in accordance with ASTM F-904.

35. A coextruded multilayer packaging film according to claim 34, wherein said peelable/resealable bond has an initial first peel strength of at least 3 lb/in (0.54 Kg/cm) as measured in accordance with ASTM F-904.

36. A coextruded multilayer packaging film according to claim 31, wherein said peelable/resealable bond has a re-tack second peel strength of at least 0.50 lb/in (0.09 Kg/cm) as measured in accordance with ASTM F-904.

37. A coextruded multilayer packaging film according to claim 36, wherein said peelable/resealable bond has a re-tack second peel strength of at least 0.60 lb/in (0.11 Kg/cm) as measured in accordance with ASTM F-904.

38. A coextruded multilayer packaging film according to claim 31, wherein said polymeric first layer has a thickness of between 0.05-0.5 mil (1.27-12.7 μm).

39. A coextruded multilayer packaging film according to claim 38, wherein said polymeric first layer has a thickness of between 0.1-0.3 mil (2.54-7.62 μm).

40. A coextruded multilayer packaging film according to claim 31, wherein said polymeric first layer is a food-contact layer.

41. A coextruded multilayer film packaging according to claim 31, wherein said film forms a container or a portion thereof.

* * * * *